(12) United States Patent
Parker

(10) Patent No.: US 8,058,751 B2
(45) Date of Patent: Nov. 15, 2011

(54) CIRCUIT INTERRUPTER AND METHOD OF PROCESSOR PHASE SYNCHRONIZATION

(75) Inventor: Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 723 days.

(21) Appl. No.: 11/877,900

(22) Filed: Oct. 24, 2007

(65) Prior Publication Data

US 2009/0108967 A1    Apr. 30, 2009

(51) Int. Cl.
*H02H 3/00* (2006.01)
*H02H 3/46* (2006.01)

(52) U.S. Cl. .................................... 307/127; 307/129
(58) Field of Classification Search .................. 307/127, 307/129
See application file for complete search history.

(56) References Cited

U.S. PATENT DOCUMENTS

| | | | | |
|---|---|---|---|---|
| 4,782,422 A | * | 11/1988 | Jones et al. | 361/87 |
| 4,788,619 A | * | 11/1988 | Ott et al. | 361/91.1 |
| 5,224,006 A | | 6/1993 | MacKenzie et al. | |
| 5,260,676 A | | 11/1993 | Patel et al. | |
| 5,293,522 A | | 3/1994 | Fello et al. | |
| 5,428,495 A | * | 6/1995 | Murphy et al. | 361/85 |
| 5,559,719 A | * | 9/1996 | Johnson et al. | 700/293 |
| 5,691,869 A | | 11/1997 | Engel et al. | |
| 5,729,145 A | * | 3/1998 | Blades | 324/536 |
| 5,875,087 A | * | 2/1999 | Spencer et al. | 361/87 |
| 6,611,411 B2 | * | 8/2003 | Williams et al. | 361/93.1 |
| 6,717,394 B2 | * | 4/2004 | Elms | 324/76.39 |
| 6,779,125 B1 | * | 8/2004 | Haban | 713/500 |
| 6,859,042 B2 | * | 2/2005 | Parker | 324/536 |
| 7,193,827 B2 | * | 3/2007 | Reid et al. | 361/42 |
| 7,391,218 B2 | * | 6/2008 | Kojori et al. | 324/520 |
| 7,633,728 B2 | * | 12/2009 | Parker et al. | 361/42 |
| 7,633,736 B2 | * | 12/2009 | Domitrovich et al. | 361/115 |
| 7,636,616 B2 | * | 12/2009 | Fletcher et al. | 700/292 |
| 7,864,492 B2 | * | 1/2011 | Restrepo et al. | 361/42 |

OTHER PUBLICATIONS

Underwriters Laboratories Inc. (UL), "Software in Programmable Components", UL 1998 ISBN 0-7629-0321-X, May 29, 1998, 38 pp.

* cited by examiner

*Primary Examiner* — Jared Fureman
*Assistant Examiner* — Adi Amrany
(74) *Attorney, Agent, or Firm* — Martin J. Moran

(57) ABSTRACT

A circuit breaker includes a line terminal, a load terminal, separable contacts electrically connected in series between the terminals, a neutral conductor, and an operating mechanism structured to open and close the contacts and trip open the contacts in response to a trip signal. A first sensor senses an electrical characteristic operatively associated with the contacts. A second sensor detects zero crossings, a consecutive pair of the crossings defining a corresponding half-cycle and a first frequency. A processor cooperates with the sensors and includes a routine and a timer having a second frequency. The routine determines, for each of the half-cycles and responsive to the timer, plural samples of the sensed electrical characteristic in a phase synchronized relationship to a corresponding one of the crossings, and determines whether one of the frequencies exceeds a number of corresponding predetermined values for a number of times and responsively outputs the trip signal.

2 Claims, 8 Drawing Sheets

CIRCUIT INTERRUPTER AND METHOD OF PROCESSOR PHASE SYNCHRONIZATION

BACKGROUND OF THE INVENTION

1. Field of the Invention

This invention pertains generally to circuit interrupters and, more particularly, to such circuit interrupters structured to trip open separable contacts responsive to trip conditions, such as for example, arc fault, ground fault and/or overvoltage conditions. The invention also relates to methods of processor phase synchronization.

2. Background Information

Circuit interrupters include, for example, circuit breakers, contactors, motor starters, motor controllers, other load controllers and receptacles having a trip mechanism. Circuit breakers are generally mature and well known in the art. Examples of circuit breakers are disclosed in U.S. Pat. Nos. 5,260,676; and 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

In many applications, the miniature circuit breaker also provides ground fault protection. Typically, an electronic circuit detects leakage of current to ground and generates a ground fault trip signal. This trip signal energizes a shunt trip solenoid, which unlatches the operating mechanism, typically through actuation of the thermal-magnetic trip device.

Recently, there has been considerable interest in also providing protection against arc faults. Arc faults are intermittent high impedance faults, which can be caused, for instance, by worn insulation between adjacent conductors, by exposed ends between broken conductors, and in other situations where conducting elements at different potentials are in close proximity. Because of their intermittent and high impedance nature, arc faults do not generate currents of either sufficient instantaneous magnitude or sufficient average heating or RMS current value large enough to trip the conventional circuit interrupter. Even so, the arcs can cause damage or start a fire if they occur near combustible material. It is not practical to simply lower the pick-up currents on conventional circuit breakers, as there are many typical loads that draw similar currents and would, therefore, cause nuisance trips. Consequently, separate electrical circuits have been developed for responding to arc faults. See, for example, U.S. Pat. Nos. 5,224,006; and 5,691,869.

The operation of the protective algorithm of some residential circuit breakers is designed assuming that the processor (e.g., microcontroller) captures certain pieces of critical system data coincident with particular phase angles of the line-to-neutral source voltage. If some critical piece or pieces of data are collected at improper phase angles relative to the line-to-neutral voltage, then there is a possibility that the protective algorithm may misidentify normal circuit operation as being an undesirable or hazardous condition and unnecessarily interrupt the power circuit.

UL 1998, a standard for software in programmable components, discloses measures to address microelectronic hardware failure modes, including physical failures of a microelectronic hardware clock. This standard also discloses that software addresses identified risks, that frequency monitoring denotes a fault/error control technique in which clock frequency is compared with an independent fixed frequency, and that software maintains a Risk Addressed state upon detection of a condition that is capable of resulting in a risk.

There is room for improvement in circuit interrupters.

There is also room for improvement in methods of processor phase synchronization.

SUMMARY OF THE INVENTION

A circuit interrupter, such as a residential circuit breaker, should exhibit minimal (and preferably no) "nuisance trips" (i.e., interrupting of the power circuit as a result of improperly identifying a non-hazardous circuit condition as being hazardous).

These needs and others are met by embodiments of the invention, which ensure proper circuit interrupter processor phase synchronization with an alternating current power circuit as line frequency varies within certain tolerances and/or as processor timer frequency varies within certain tolerances.

In accordance with one aspect of the invention, a circuit interrupter is for a power circuit including a plurality of alternating current half-cycles having a plurality of zero crossings, the circuit interrupter comprises: a line terminal; a load terminal; separable contacts electrically connected in series between the line terminal and the load terminal; a neutral conductor; an operating mechanism structured to open and close the separable contacts, the operating mechanism being further structured to trip open the separable contacts in response to a trip signal; a first sensor structured to sense an electrical characteristic operatively associated with the separable contacts; a second sensor structured to detect the zero crossings, a consecutive pair of the zero crossings defining a corresponding one of the half-cycles and a first frequency; and a processor cooperating with the first and second sensors, the processor comprising a routine and a timer including a second frequency, the routine being structured to determine, for each of the half-cycles and responsive to the timer, a number of samples of the sensed electrical characteristic in a phase synchronized relationship to a corresponding one of the zero crossings, and to determine whether one of the first and second frequencies exceeds a number of corresponding predetermined values for a number of times and responsively output the trip signal.

The processor may further comprise an interrupt input and a timer. The interrupt input may be synchronized with the zero crossings. The routine of the processor may be further structured to configure the timer to generate another interrupt at a time corresponding to a portion of a corresponding one of the half-cycles. The routine and the timer may be structured to count a count related to the duration of a corresponding one of the half-cycles as measured between the most recent pair of the zero crossings.

The routine of the processor may be further structured: (a) to configure the timer to generate a predetermined count of interrupts at times corresponding to portions of the corresponding one of the half-cycles, and (b) to determine whether the interrupt input occurred following a current count of the interrupts, the current count of the interrupts being different than the predetermined count of interrupts, and responsively increment a counter and, otherwise, to responsively clear the counter. The routine of the processor may be further structured to output the trip signal when the counter exceeds a predetermined trip threshold.

As another aspect of the invention, a method is for a power circuit including a plurality of alternating current half-cycles having a plurality of zero crossings. The method comprises: repetitively sensing an electrical characteristic associated with the power circuit; detecting the zero crossings, a consecutive pair of the zero crossings defining a corresponding one of the half-cycles and a first frequency; employing a timer including a second frequency; determining, for each of the half-cycles and responsive to the timer, a number of samples of the electrical characteristic in a phase synchronized relationship to a corresponding one of the zero crossings; and determining whether one of the first and second frequencies exceeds a number of corresponding predetermined values for a number of times and responsively interrupting the power circuit.

The method may employ a first interrupt synchronized with the zero crossings; configure the timer to generate a second interrupt at a time corresponding to a portion of a corresponding one of the half-cycles; and count a count related to the duration of a corresponding one of the half-cycles as measured between the most recent pair of the zero crossings.

The method may configure the timer to generate a predetermined count of the second interrupt at times corresponding to portions of the corresponding one of the half-cycles; and determine whether the first interrupt occurred following a current count of the second interrupt, the current count of the second interrupt being different than the predetermined count of the second interrupt, and responsively increment a counter and, otherwise, responsively clear the counter.

The method may output the trip signal when the counter exceeds a predetermined trip threshold.

As another aspect of the invention, a method is for a power circuit including a plurality of alternating current half-cycles having a plurality of zero crossings. The method comprises: repetitively sensing an electrical characteristic associated with the power circuit; detecting the zero crossings, a consecutive pair of the zero crossings defining a corresponding one of the half-cycles and a first frequency; employing a timer including a second frequency; determining, for each of the half-cycles and responsive to the timer, a number of samples of the electrical characteristic in a phase synchronized relationship to a corresponding one of the zero crossings; and determining whether a ratio of the first and second frequencies exceeds a number of predetermined values for a number of times and responsively interrupting the power circuit.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the terms "exceed" or "exceeded" or variations thereof, mean to go beyond (e.g., above; below) a number of a number of limits, measures or degrees.

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The invention is described in association with a single pole arc fault circuit breaker, although the invention is applicable to a wide range of circuit interrupters having any number of poles and operable at any suitable line frequency (e.g., without limitation, 50 Hz; 60 Hz; 400 Hz).

Figure 1:
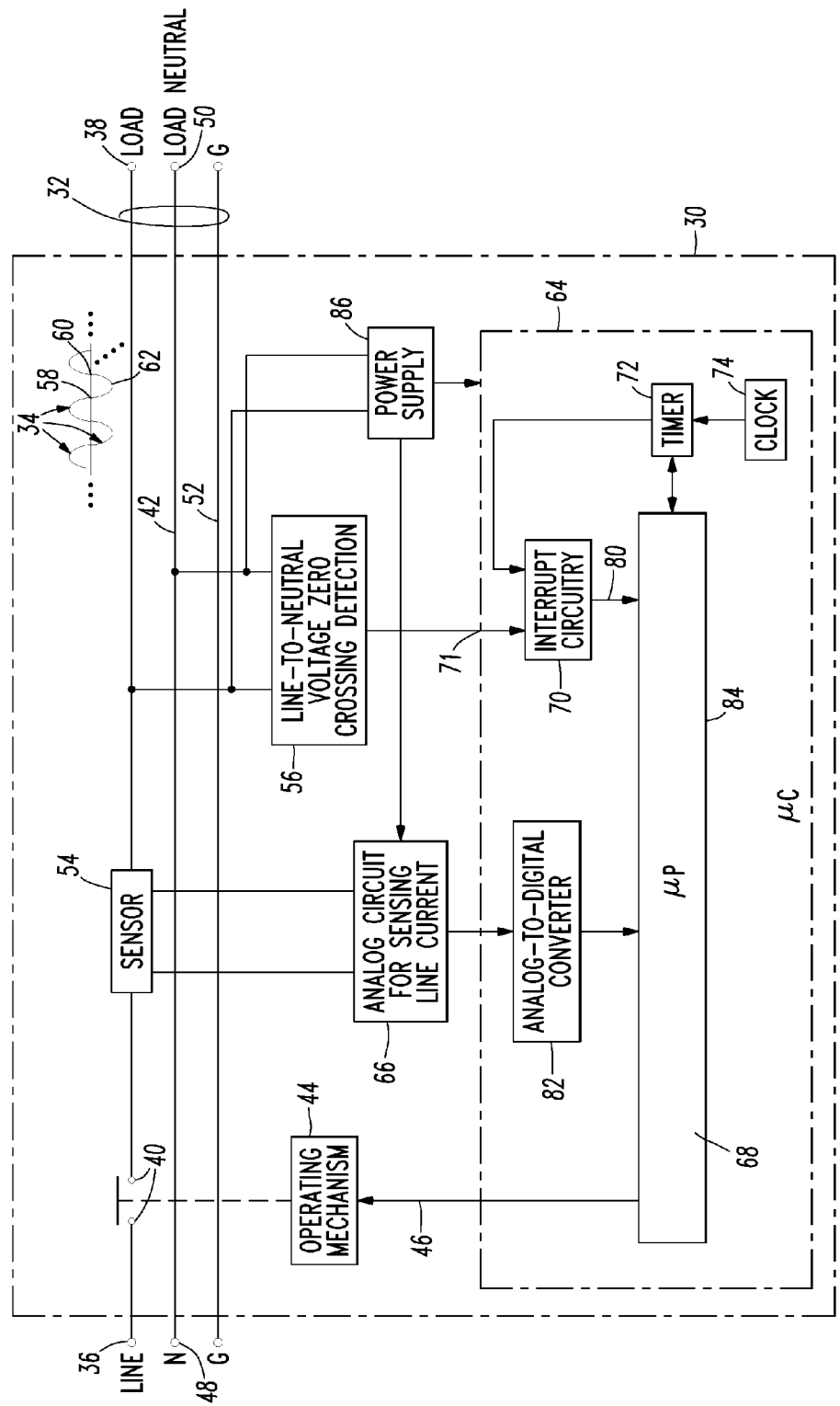
FIG. 1 is a block diagram of a circuit breaker in accordance with embodiments of the invention.

FIG. 1 shows an arc fault circuit breaker 30 for a power circuit 32 including a plurality of alternating current half-cycles 34. The arc fault circuit breaker 30 includes a line terminal 36, a load terminal 38, separable contacts 40 electrically connected in series between the line and load terminals 36,38, a neutral conductor 42, and an operating mechanism 44 structured to open and close the separable contacts 40. The operating mechanism 44 is structured to trip open the separable contacts 40 in response to a trip signal 46. Although not required, the circuit breaker 30 may also include one or more of a neutral terminal 48, a load neutral terminal 50 and a ground conductor 52.

A suitable current sensor 54 is structured to sense current flowing through the separable contacts 40. A voltage sensor 56 is structured to detect a plurality of voltage zero crossings between the load terminal 38 and the neutral conductor 42. A consecutive pair of the voltage zero crossings, such as 58,60, define a corresponding one of the half-cycles 34, such as 62.

A processor, such as the example microcomputer (μC) 64, cooperates with the current sensor 54 through an analog circuit 66 and with the voltage sensor 56 to detect a resistive series arc in series with the separable contacts 40. As will be discussed, below, in connection with FIGS. 3 and 4A-4E, the μC 64 includes a routine 68. Interrupts 80 are generated by interrupt circuitry 70 in response to an interrupt input 71 from the voltage sensor 56 of FIG. 1, and from a timer 72, which is responsive to a clock 74 of the μC 64. Digital values of the sensed current from the analog circuit 66 are provided by an analog-to-digital converter (ADC) 82 to a microprocessor (μP) 84 of the μC 64.

Figure 2:
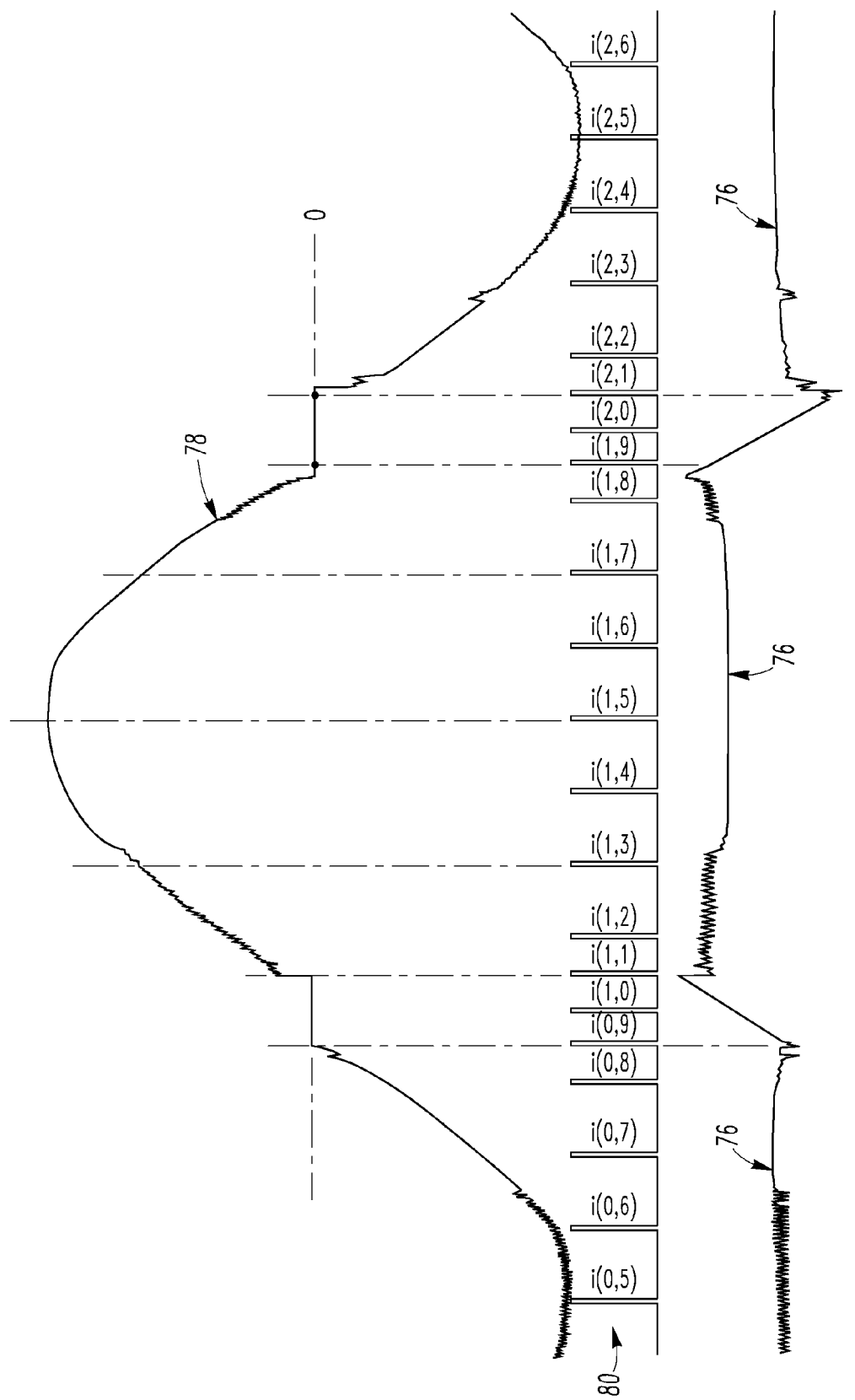
FIG. 2 is a plot of arc voltage, current during a series arc with a resistive load and a plurality of microprocessor interrupts for sampling the current.
Figure 3:
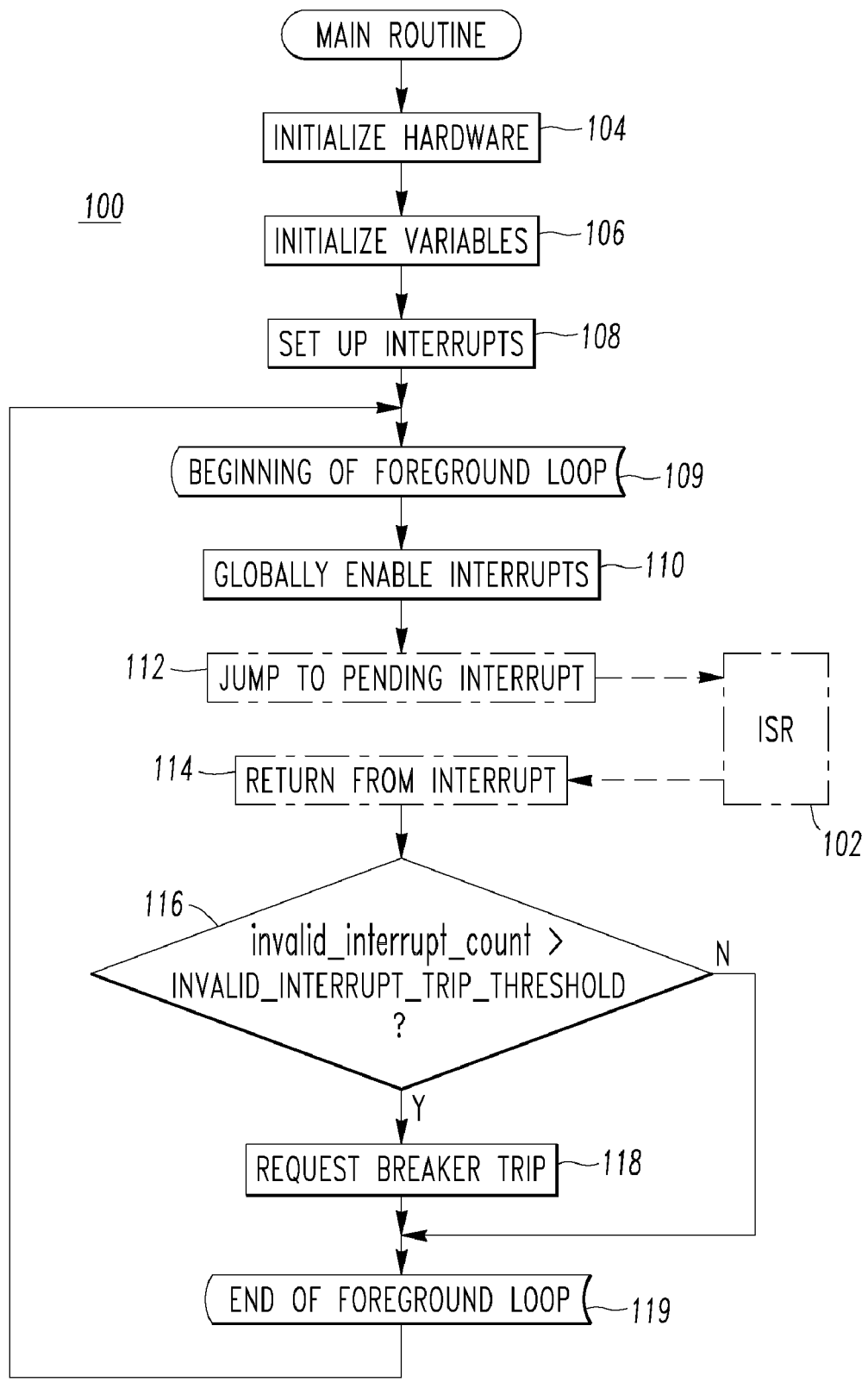
FIG. 3 is a flowchart of a main or foreground routine executed by the microprocessor of FIG. 1.
Figure 4A:
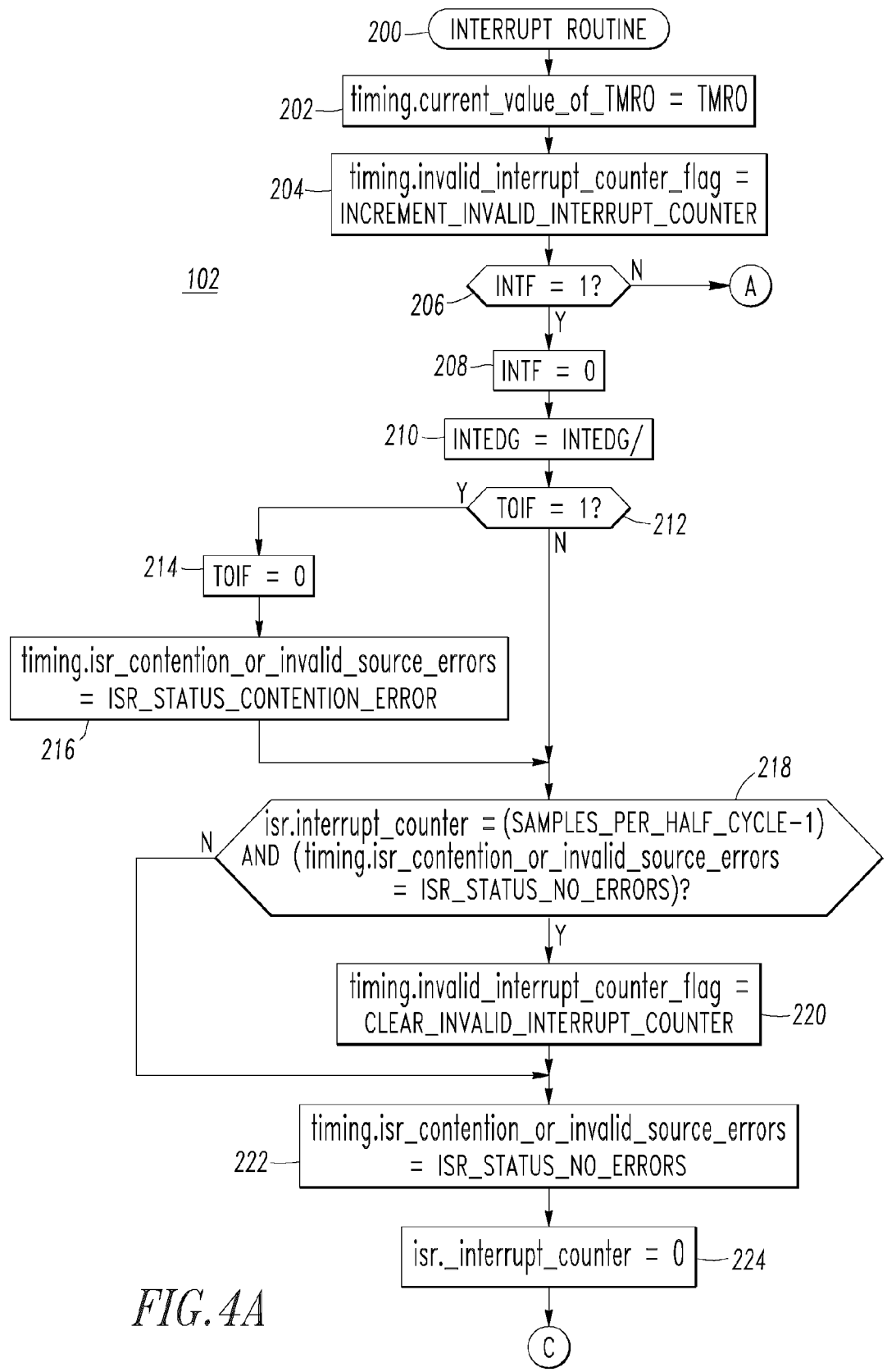
FIGS. 4A-4E form a flowchart of an interrupt service routine executed by the microprocessor of FIG. 1.
Figure 4B:
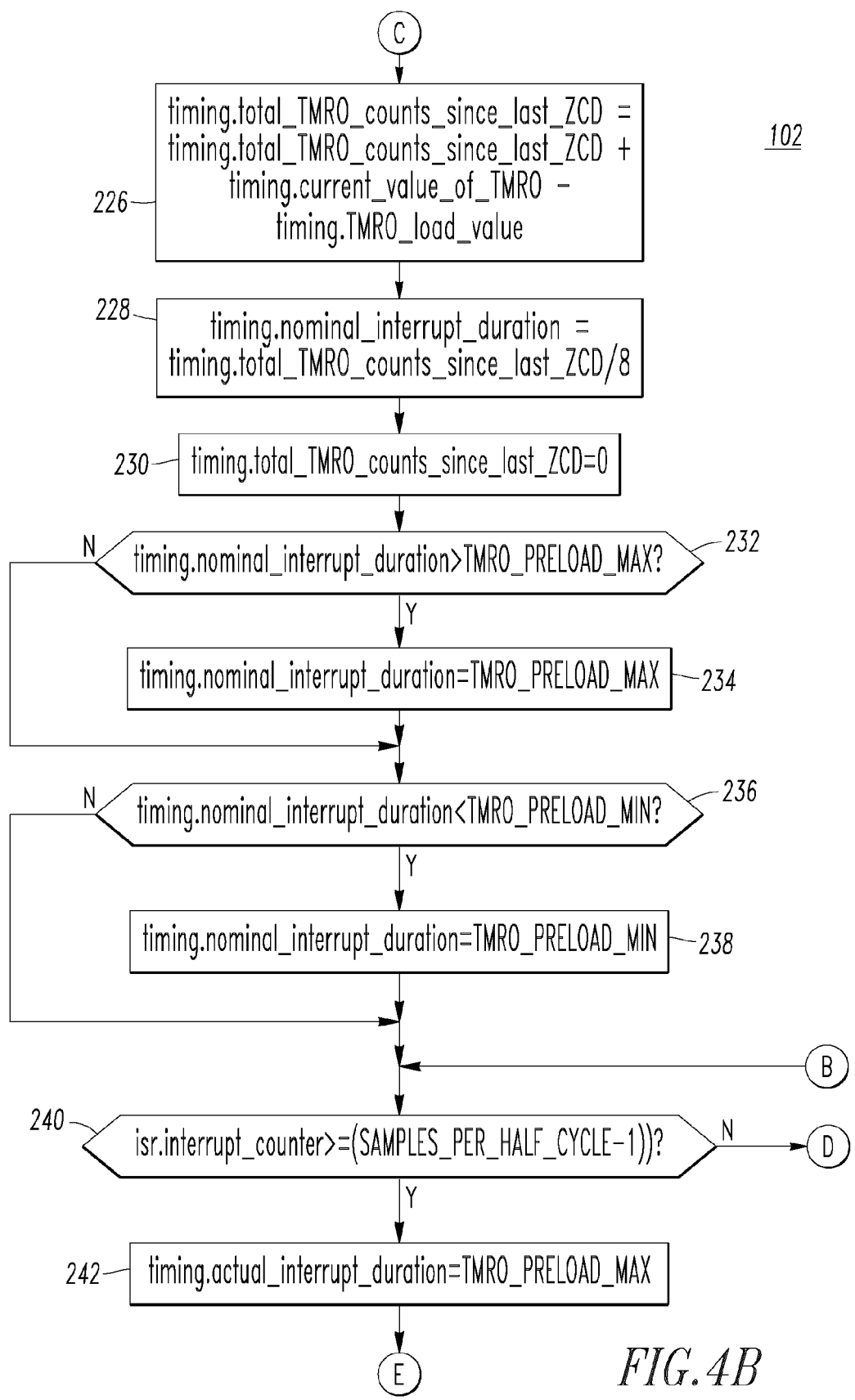
Figure 4C:
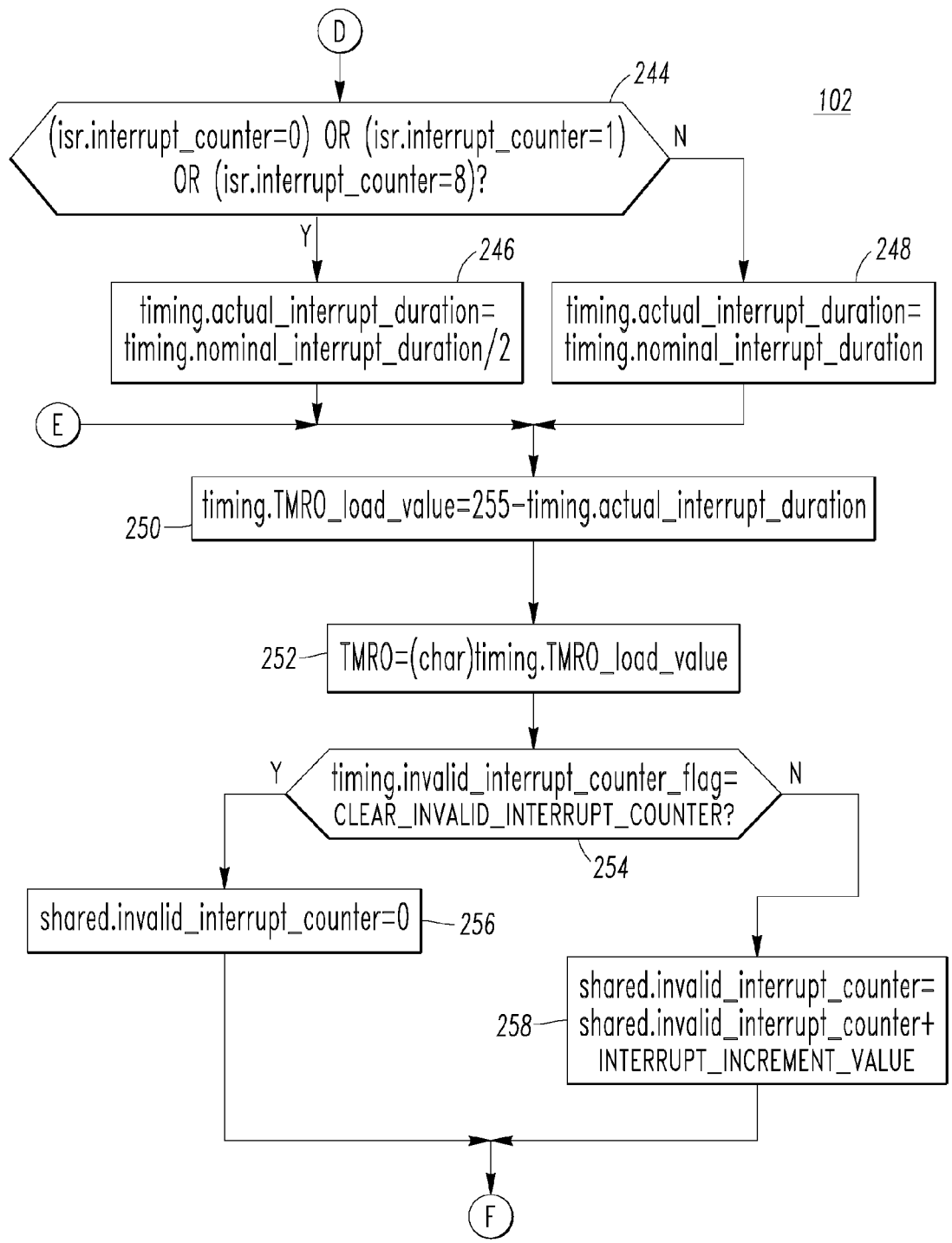
Figure 4D:
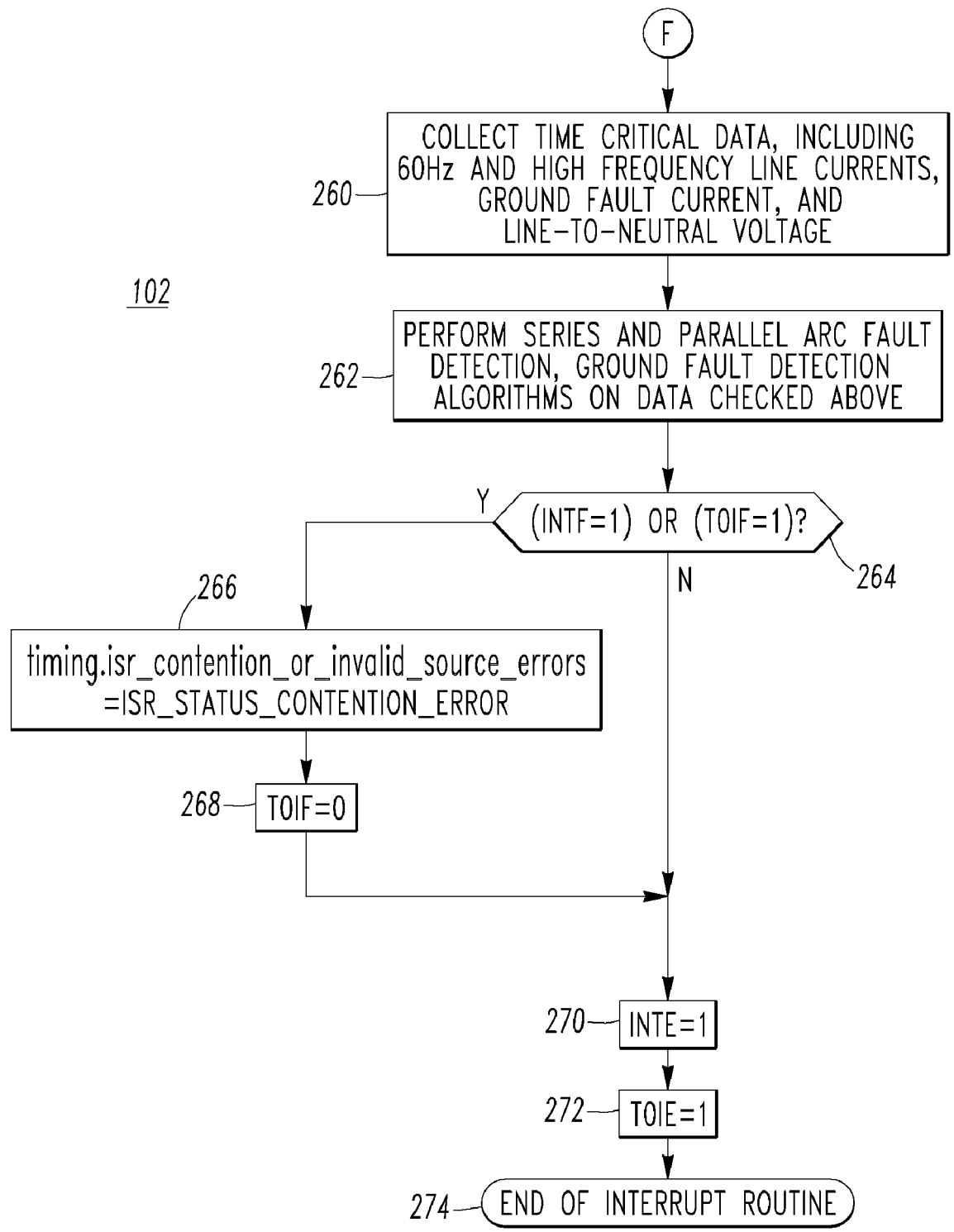
Figure 4E:
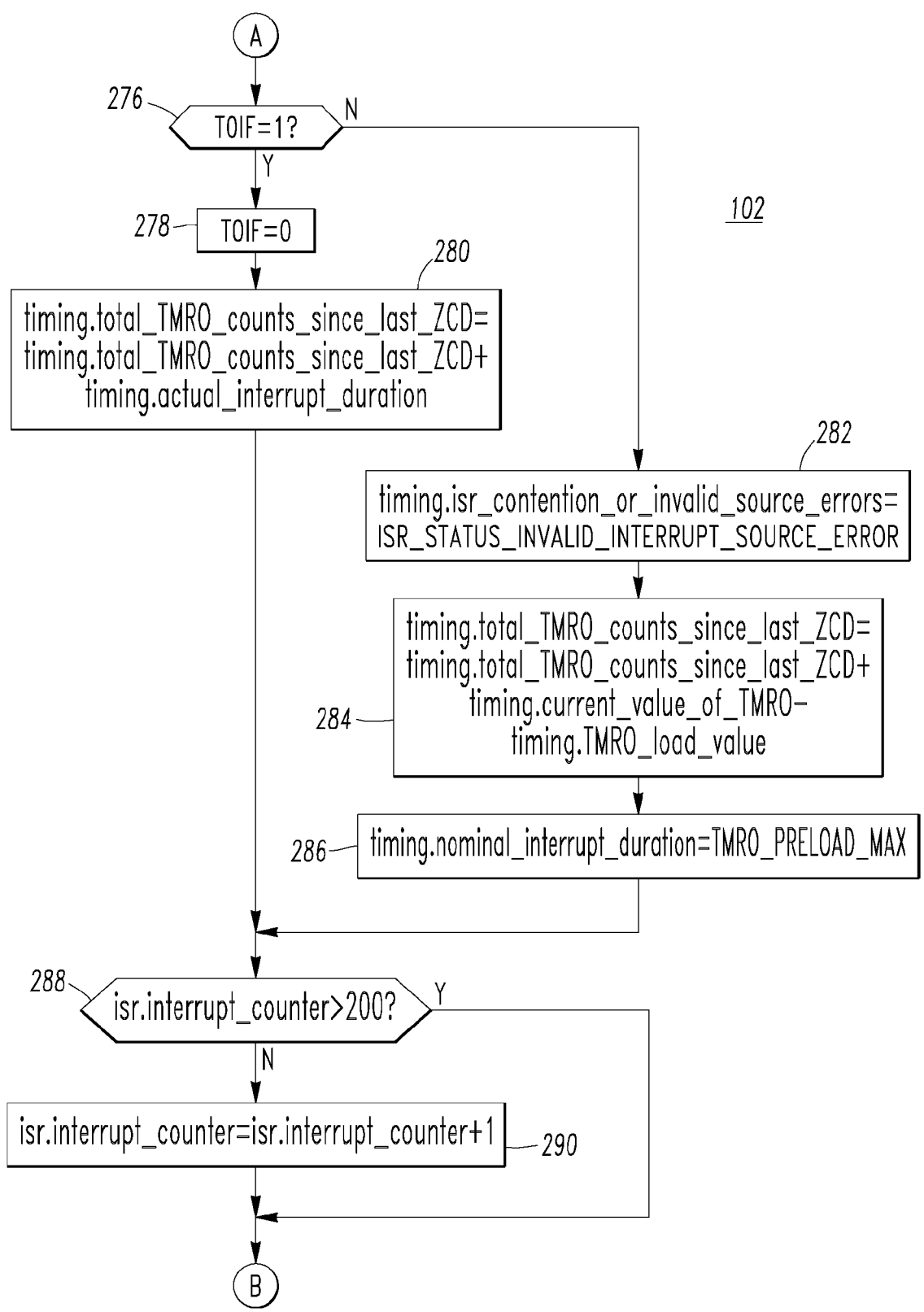

FIG. 2 shows arc voltage 76, current 78 during a series arc with a resistive load, and a plurality of the μP interrupts 80 for sampling the current 78.

The routine 68 of FIG. 1 includes a main routine 100 (FIG. 3) and an interrupt service routine (ISR) 102 (FIGS. 4A-4E). First, the main routine 100 initializes hardware, at 104, initializes variables, at 106, and sets up interrupts, at 108, which includes globally disabling interrupts, clearing a timer 0 interrupt flag of the timer 72, clearing an INT interrupt flag of the interrupt input 71 and setting the INT interrupt enable. Then, the foreground loop begins at 109. Next, at 110, all interrupt flag bits other than timer 0 and INT are cleared, all interrupt enable bits other than timer 0 and INT are cleared, and interrupts are globally enabled, after which a jump to a pending interrupt is taken at 112. After the ISR 102 (FIGS. 4A-4E) is executed, the return from interrupt occurs at 114, after which it is determined at 116 if the number of consecutive invalid interrupts (invalid_interrupt count) has exceeded the permitted value (INVALID_INTERRUPT_TRIP_THRESHOLD) (e.g., without limitation, 103,680,000, which is equivalent to about 24 hours). If so, then the trip of the circuit breaker 30 is requested at 118. Otherwise, the foreground loop ends at 119, after which step 109 is repeated.

Although example step 116 is shown in the foreground loop 109, it could also be executed at any suitable location in the interrupt service routine 102 or in the foreground loop 109 and perform the same function as an identical comparison in the foreground loop. In the interrupt service routine 102 (FIGS. 4A-4E), the example line (e.g., without limitation, 60 Hz) current is acquired, at 260, along with any other time critical data, including, for example and without limitation, line-to-neutral voltage (not shown), a number of high frequency line currents (not shown), and ground fault current (not shown), although only a single electrical characteristic needs to be repetitively sensed.

As will be discussed, the output of the voltage sensor (or detection circuit) 56, which output changes state each time the source line-to-neutral voltage changes polarity, is connected to the interrupt input 71 of μC 64. Whenever the source line-to-neutral voltage changes polarity, the polarity transition of the interrupt input 71 causes an interrupt to occur within the μP 84.

A free-running timer 72 (FIG. 1) and associated routine 102 (FIGS. 4A-4E) of μC 64 are used to determine the period of the most recent half-cycle of source voltage by counting the internal number of internal timer periods between consecutive external line-to-neutral voltage polarity change interrupt events. The period of this internal timer is a function of the clock 74 of the μC 64 and may, consequently, change over time and with temperature.

Preferably, the number of internal timer periods, which occur during a particular half-cycle of source line-to-neutral voltage, are employed to configure a second timer (not shown) to generate interrupts, which are synchronous and coincident with certain phase angles of the source voltage. However, in the disclosed circuit breaker 30 there are no additional internal timers, and the same internal timer 72 is used to both determine the period of the line-to-neutral voltage and to generate interrupts synchronous with the line-to-neutral voltage. While this approach does not directly measure either the frequency of the power source or the frequency of the μC timing reference, it does inherently measure a ratio of the frequency of the power source to the frequency of the μC timing reference. After acceptable ranges of power source frequency and μC timing reference frequency are established, minimum and maximum acceptable ratios of these quantities can be calculated, and "trip/no trip" decisions can be made based on whether the ratios are in tolerance or out of tolerance. One benefit to this approach is that it recognizes and incorporates that both the frequency of the power source and the frequency of the μC timing reference can and will vary dynamically, and the key to maintaining phase synchronism between the two dynamic quantities is maintaining a proper ratio of these two quantities.

The example μC 64 is a Microchip PIC16F690 microcontroller, although any suitable processor may be employed. The timing reference for the example μC 64 is the internal oscillator clock 74 with a nominal frequency of 8 MHz. The μP 84 performs one instruction per four clock cycles of the timing reference. The nominal frequency of the power source is 60 Hz and there is a suitable count of interrupts per half-cycle (e.g., without limitation, ten unevenly spaced interrupts per half-cycle; eight evenly spaced interrupts per half-cycle) of the power source line-to-neutral voltage.

The "timer 0" clock (TMR0) of timer 72 internal to the μC 64 generates an interrupt when an 8-bit TMR0 register overflows from 0xFF to 0x00. This is used to both generate interrupts synchronous to the line-to-neutral voltage and to estimate the period of that voltage. A prescale setting is used to set "timer 0" to increment once per sixteen μC instruction cycles. With this information, the nominal interrupt duration for TMR0 to maintain synchronization between the μC and the power source is calculated as follows:

$$InterruptDuration = \frac{ClockFrequency/SourceFrequency}{2.0 * \left(\frac{Interrupts}{SourceHalfCycle}\right) * \left(\frac{ClockCycles}{Instructions}\right) * TMR0prescale} \quad \text{(Eq. 1)}$$

wherein:

$SourceFrequency = 60.0$ Hz;

$ClockFrequency = 8,000,000.0$ Hz;

$\left(\frac{Interrupts}{SourceHalfCycle}\right) = 8$;

$TMR0prescale = 16$;

and $\left(\frac{ClockCycles}{Instructions}\right) = 4$.

When the power system frequency is at the example nominal value of 60 Hz, the period per interrupt generated by "timer 0" is 1041.67 μS. When the μC timing reference frequency is at the nominal value of 8.0 MHz, "timer 0" increments once per 8 μS. Hence, the nominal value of the TMR0 preload register is about 130.208, and the closest integer approximation is 130.

In Equation 1, above, the value of InterruptDuration will increase if ClockFrequency is nominal and SourceFrequency decreases. In this case, the μC 64 will have increased time and an increased number of instruction cycles to complete the required set of processing tasks. However, if the frequency of the power source decreases below a certain range, then the circuit breaker DC power supply 86 (FIG. 1) will start to drop out-of-tolerance and will eventually provide inadequate voltage to power the μC 64. A sustained low source power frequency could also cause misoperation or damage to loads supplied by the source.

The value of InterruptDuration will also increase if SourceFrequency is nominal and ClockFrequency increases. In this case, the μC 64 will perform more instruction cycles per half-cycle of line voltage. However, if the frequency of the μC clock 74 increases outside the specified tolerance for the μC 64, then the μC will malfunction (e.g., due to timing issues; heating caused by increased power dissipation; another cause), thereby resulting in loss of power circuit protection. To prevent this condition, the μC 64 should trip the circuit breaker 30 in response to detecting an out-of-tolerance high μC timing reference.

Hence, a persistent out-of-range high value of InterruptDuration indicates either an out-of-tolerance high μC timing reference frequency or an out-of-tolerance low power source frequency, but without additional information the μC 64 cannot determine which condition is the cause.

The value of InterruptDuration will decrease if SourceFrequency is nominal and ClockFrequency decreases. If the frequency of the μC timing reference decreases below nominal, then the μC 64 will not be damaged, since it is designed to operate from a specified maximum frequency tolerance down to DC. However, if the frequency of the μC timing references decreases sufficiently, then the μP 84 will eventually fail to complete the required processing tasks in the allotted time. After this point, loss of meaningful protection probably occurs and nuisance trips may occur.

The value of InterruptDuration will also decrease if Clock-Frequency remains constant and SourceFrequency increases. If the frequency of the power source increases beyond a certain range, then the μC 64 will eventually fail to complete the required processing tasks in the available time, and will fail to maintain synchronous data collection. After this point, loss of meaningful protection will occur and nuisance trips may occur.

Hence, a persistent out-of-range low value of InterruptDuration indicates either an out-of-tolerance low μC timing reference frequency or an out-of-tolerance high power source frequency, but without additional information the μC 64 cannot determine which condition is the cause.

In all of the above scenarios, the μC 64 determines whether one of the two frequencies exceeds a number of corresponding predetermined values for a number of times and responsively outputs the trip signal 46, as will be described, below, in connection with step 218 of FIGS. 4A-4E.

EXAMPLE 1

In one particular example, the allowable percentage variation in frequency from half-cycle to half-cycle is a function of the ratio of the power source frequency to the microcontroller clock frequency, a function of TMR0 being set to wait (TMR0_PRELOAD_MAX) before the next interrupt after interrupt 9, and a function of the time employed to execute interrupt 9. Example equations to predetermine these variations are given in Equation 2 (allowable positive variation (APV)) and Equation 3 (allowable negative variation (ANV)):

$$APV = (2*TMR0\_PRELOAD\_MAX*TMR0prescale* \\ (ClockCycles/Instruction)*(SourceFrequency/ \\ ClockFrequency))*100\% - 6.25\% \quad (Eq. 2)$$

$$ANV = (2*(count\ of\ instructions\ in\ interrupt\ 9)* \\ (ClockCycles/Instruction)*(SourceFrequency/ \\ ClockFrequency))*100\% - 6.25\% \quad (Eq. 3)$$

wherein:
SourceFrequency is 60.0 Hz or any suitable source frequency;
ClockFrequency is 8,000,000.0 Hz or any suitable clock frequency;
TMR0_PRELOAD_MAX is 136.719 or any suitable count; count of instructions in interrupt 9 is 250 (250 instructions* (ClockCycles/Instruction)*(1/ClockFrequency)=125 μS) or any suitable count (time);
TMR0prescale is 16 or any suitable prescale value; and (ClockCycles/Instruction) is 4 or any suitable ratio.

For the above non-limiting example values, the allowable percentage variation in frequency from half-cycle to half-cycle is +6.875% and −4.75%.

The example Equations 2 and 3 apply where the ratio (SourceFrequency/ClockFrequency) (nominally 0.0000075) is limited to values between and including 0.0000075*0.95 and 0.0000075*1.05 (or +/−5% of 0.0000075). It will be appreciated that other suitable equations may be employed when the ratio of SourceFrequency/ClockFrequency is outside these limits (i.e., when "timing.nominal_interrupt_duration" is clamped at either TMR0_PRELOAD_MIN or TMR0_PRELOAD_MAX).

EXAMPLE 2

As an alternative to Example 1, the μC 64 determines whether a ratio of the first and second frequencies (e.g., SourceFrequency/ClockFrequency of Example 1) exceeds a number of corresponding predetermined values (e.g., without limitation, +/−5% of 0.0000075) for a number of times (e.g., any suitable count; a count corresponding to one day) and responsively outputs the trip signal 46. Here, for example, a first timer is dedicated to the first frequency (SourceFrequency) and a second timer is dedicated to the second frequency (ClockFrequency). The ratio (SourceFrequency/ClockFrequency) is determined from the ratio (Tclock/Tsource), which is the ratio of the second time (Tclock timed by the second timer) to the first time (Tsource timed by the first timer). Here, it is determined whether the ratio (SourceFrequency/ClockFrequency) (nominally 0.0000075) is between and including 0.0000075*0.95 and 0.0000075*1.05. If that ratio exceeds those corresponding predetermined values for a number of times, then the trip signal 46 is responsively output.

The following provides a summary of the example phase synchronization and interrupt error detection approach. There are six example steps discussed, below. Steps one and two occur in hardware, steps three through five occur in the interrupt handling or background routine 102, and step six occurs in the main or foreground routine 100. It will be appreciated, however, that these steps may be performed using any suitable combination of hardware and/or software.

In the first step, a signal, which is proportional to line-to-neutral voltage, is input to the detection circuit 56. The transfer function of the detection circuit 56 is if the input voltage (and thereby the line-to-neutral voltage) is greater than zero, then the output is a digital one; otherwise, the output is a digital zero.

Second, the digital output of the detection circuit 56 is connected to the interrupt input 71 of the μC 64 with associated circuitry, which generates a μP interrupt when the output of the detection circuit 56 (and, thereby, the line-to-neutral voltage) changes state.

In the third step, the μP 84 uses the interrupts associated with the detection circuit 56 to synchronize with the line-to-neutral voltage. Specifically, following a line-to-neutral voltage interrupt or a "timer 0" timeout interrupt, the μP 84 reconfigures "timer 0" to generate a future interrupt at a time corresponding to ⅛ of the period of the previous half-cycle of the line-to-neutral voltage. The value loaded into μC "timer 0" to generate the future interrupt is calculated from the number of "timer 0" "counts" or timer state changes that occurred during the previous half-cycle of the line-to-neutral voltage, as defined by the two most recent polarity changes of the line-to-neutral voltage.

Fourth, because of reasons given above, the value loaded into "timer 0" is limited to a ±5% deviation from the "timer 0" load value at nominal power system frequency and nominal μC clock frequency.

In the fifth step, in addition to the above operations, when an interrupt occurs, it is determined whether that interrupt resulted from a change in state of the output of the detection circuit 56. If so, and if the previous, for example, seven (e.g., assuming eight uniformly spaced interrupts per half-cycle of the source voltage) interrupts were produced by "timer 0" overflows, then a counter is cleared; otherwise, the counter is incremented.

Finally, in the sixth step, if the value of the counter exceeds a predetermined trip threshold, then the μC 64 issues the trip signal 46. The operating mechanism 44 then takes the necessary actions to interrupt any current flowing through the circuit breaker 30 (e.g., by physically interrupting the current conduction path through the circuit breaker separable contacts 40).

FIGS. 4A-4E show routine 102 for steps three through five, above. The routine 102 begins at 200. Next, at 202, the current value (TMR0) of TMR0 (timer 72) is captured (timing.current_value_of_TMR0), and an invalid interrupt counter flag (timing.invalid_interrupt_counter_flag) is set to a default value (e.g., without limitation, 1), at 204. Then, at 206, it is determined if the present interrupt call is the result of a line-to-neutral voltage zero crossing detector change-of-state. If INTF is one, then execution resumes at 208. Otherwise, execution resumes at 276, as will be discussed. At 208, the interrupt flag (INTF) that indicates that a line-to-neutral voltage zero crossing detector change-of-state has occurred is cleared. Next, at 210, since the zero crossing interrupt occurs on edge transitions, the bit that indicates whether the next interrupt will occur on a rising or falling edge zero crossing transition is inverted (INTEDG=INTEDG/). For example, if the latest zero crossing transition was a rising edge, then the next zero crossing transition will be a falling edge. INTEDG is initialized in step 108 of FIG. 3. The μC 64 reads the value of the interrupt input 71 (INT) at that time and sets INTEDG (e.g., if INT was high, then INTEDG is set so that an interrupt occurred on the falling edge of INT; if INT was low, then INTEDG is set so that an interrupt occurred on the rising edge of INT).

Then, at 212, it is determined if this zero crossing interrupt call occurs with TMR0 interrupt contention by checking if T0IF is equal to one. If so, then at 214, the TMR0 timeout flag (T0IF) is cleared to zero. Next, at 216, a flag (timing.isr_contention_or_invalid_source_errors) is set to indicate interrupt contention has occurred (ISR_STATUS_CONTENTION_ERROR). Then, after 216, or if the test at 212 failed, at 218, it is determined if the expected number of TMR0 overflows (SAMPLES_PER_HALF_CYCLE-1) occurred (by checking isr.interrupt_counter, which is updated at 288 and 290) since the last zero crossing detector change-of-state, and if no interrupt contention or invalid interrupt source error occurred since the last zero crossing detector change-of-state. If so, then, at 220, the invalid interrupt counter flag (timing.invalid_interrupt_counter_flag) is set to a suitable value (e.g., without limitation, 2; any suitable value such that the value stored in "timing.invalid_interrupt_counter_flag" at either 204 or 220 causes the conditional at 254 to take the proper branch), in order to clear the invalid interrupt counter. Next, or if the test failed at 218, at 222, the flag (timing.isr_contention_or_invalid_source_errors), which is used to track whether any interrupt contention or invalid interrupt source errors occur between this zero crossing interrupt and the next one, is reset (to ISR_STATUS_NO_ERRORS) (e.g., without limitation, any suitable value such that the conditional at 218 takes the proper branch). Then, at 224, since this interrupt was initiated by a change-of-state of the line-to-neutral voltage zero crossing detector, by definition, isr.interrupt_counter is set to zero for interrupt "0".

Next, at 226, the running total of TMR0 counts since the last zero crossing detector change-of-state (timing.total_TMR0_counts_since_last_ZCD) is finalized by adding to it the number of TMR0 counts since the previous interrupt (timing.current_value_of_TMR0−timing.TMR0_load_value). Then, at 228, the new timer 0 interrupt duration (timing.nominal_interrupt_duration) for 22.5° (=180°/8) is calculated as a function (⅛) of the final total of TMR0 counts (timing.total_TMR0_counts_since_last_ZCD from step 280) since the last zero crossing detector change-of-state. Next, at 230, the variable (timing.total_TMR0_counts_since_last ZCD), which holds the total of TMR0 counts since the last line-to-neutral voltage zero crossing detector change-of-state prior to beginning the tally of TMR0 counts for the next half-cycle, is cleared.

Then, at 232, it is determined if the new value of timing.nominal_interrupt_duration is greater than the acceptable range for normal arc fault protection. For example, this could indicate a utility source frequency, which is out-of-tolerance low, or a μP clock frequency, which is out-of-tolerance high. If so, then at 234, the value of timing.nominal_interrupt_duration is limited to TMR0_PRELOAD_MAX, which, for example and without limitation, is a suitable value based upon 105% of the value calculated from Equation 1.

Next, or if the test at 232 failed, at 236, it is determined if the new value of timing.nominal_interrupt_duration is less than the acceptable range (TMR0_PRELOAD_MIN) for normal arc fault protection. If so, then this could indicate a utility source frequency, which is out-of-tolerance high, or a μP clock frequency, which is out-of-tolerance low. If so, then at 238, the value of timing.nominal_interrupt_duration is limited to TMR0_PRELOAD_MIN, which, for example and without limitation, is a suitable value based upon 95% of the value calculated from Equation 1.

At 240, it is determined if isr.interrupt_counter is greater than or equal to one less than the nominal number (e.g., without limitation, 10) of interrupts per half-cycle (SAMPLES_PER_HALF_CYCLE−1). If so, then at 242, the duration of this TMR0 interrupt (timing.actual_interrupt_duration) and any subsequent number of interrupts that occur before the next line-to-neutral voltage zero crossing detector interrupt is lengthened to TMR0_PRELOAD_MAX. If the test failed at 240, then at 244, it is determined if isr.interrupt_counter indicates that the next interrupt should have a shortened period of 12.25°. This occurs if isr.interrupt_counter is equal to zero, one or eight. If so, then at 246, the duration (timing.actual_interrupt_duration) for this TMR0 interrupt is set for 12.25° of the utility source voltage, which is 1/16 times the measured period of the previous half-cycle or timing.nominal_interrupt_duration/2. If the test failed at 244, then at 248, the duration for this TMR0 interrupt is set for 22.5° of the utility source voltage, which is ⅛ times the measured period of the previous half-cycle of timing.nominal_interrupt_duration.

Next, after 242, 246 or 248, at 250, a value (timing.TMR0_load value) to load into TMR0 is calculated as being 255 less timing.actual_interrupt duration. Then, at 252, this value is loaded into TMR0, as, for example and without limitation, an 8-bit version of timing.TMR0_load_value. Next, at 254, it is determined whether to increment or clear the invalid interrupt counter (timing.invalid_interrupt_counter_flag), based on the invalid interrupt counter flag (CLEAR_INVALID_INTERRUPT_COUNTER). If the invalid interrupt counter is cleared, then at 256, the interrupt sequence since the last zero crossing is valid, and the interrupt error counter (shared.invalid_interrupt_counter) is cleared to zero. Otherwise, the invalid interrupt counter (shared.invalid_interrupt_counter) is incremented (e.g., by one) during every interrupt. If interrupts are operating properly, then this counter will be reset to zero during each zero crossing interrupt.

After 256 or 258, time critical data, including example 60 Hz sensed current and, for example and without limitation, a number of high frequency line currents, ground fault current, and line-to-neutral voltage are collected at 260. Then, at 262, one or more of series and parallel arc fault detection, and ground fault detection is performed on the data collected above. Next, at 264, it is determined if a zero crossing detector change-of-state (INTF=1) or a TMR0 timeout (T0IF=1) occurred during the processing of this interrupt. If so, then at 266, a flag (timing.isr_contention_or_invalid_source_errors) is set (ISR_STATUS_CONTENTION_ERROR) to indicate interrupt contention has occurred. Next, at 268, the TMR0 timeout interrupt flag is cleared (T0IF=0) in case TMR0 was the source of contention, but the INT interrupt flag is not cleared if a zero crossing was the source of contention. Next, or if the test failed at 264, the INT interrupt enable flag is refreshed (INTE=1) at 270 and the timer 0 interrupt enable flag is refreshed (T0IE=1) at 272, before the end of the interrupt routine at 274.

If the test failed at 206, then at 276, it is determined if the interrupt call is the result of a TMR0 timeout (T0IF=1). If so, then at 278, the TMR0 timeout interrupt flag (T0IF) is cleared. Next, at 280, the count of TMR0 counts since the previous interrupt (timing.actual_interrupt_duration) is added to the running total (timing.total_TMR0_counts_since_last_ZCD) of TMR0 counts since the previous change-of-state of the line-to-neutral voltage zero crossing detector.

Otherwise, if the test failed at 276, then even steps 282-286 deal with an error condition caused by an unexpected interrupt, since all interrupt sources other than the interrupt input 71 (e.g., input of the line-to-neutral voltage zero crossing detector) and TMR0 are disabled. In this event, a flag is set to indicate the error, the total of TMR0 counts since the last zero crossing detector is updated in a reasonable fashion, and a reasonable timeout period for timer 0 is set. At 282, the flag (timing.isr_contention_or_invalid_source_errors) is set (ISR_STATUS_INVALID_INTERRUPT_SOURCE_ERROR) to indicate an invalid interrupt occurred as the result of an invalid interrupt source. Next, at 284, the running count (timing.total_TMR0_counts_since_last ZCD) of TMR0 counts since the last zero crossing detector change-of-state is finalized by adding the number of TMR0 counts (timing.current_value_of_TMR0–timing.TMR0_load value) since the previous interrupt. Then, at 286, the nominal TMR0 interrupt duration (timing.nominal_interrupt_duration) is set to a reasonable value (TMR0_PRELOAD_MAX).

After 280 or 286, at 288 and 290, a suitable upper limit is placed on the count of interrupts (isr.interrupt_counter), which is an 8-bit number, to prevent overflow. At 288, it is determined if isr.interrupt_counter is greater than 200. If not, then at 290, the count of interrupts (isr.interrupt_counter) (TMR0 or otherwise) that have occurred since the last zero crossing detector change-of-state is incremented. After 290, execution resumes at 240.

The disclosed circuit breaker 30 prevents residential circuit breaker nuisance trips in response to variations in the frequency of the power source, whether encountered during normal utility power system operation or when due to operation with a non-utility power source (e.g., a backup generator, in which the voltage frequency is often not as tightly regulated as a utility source).

The disclosed circuit breaker 30 ensures proper synchronism of data sampling if the clock reference for the μC 64 changes in response to aging mechanisms, temperature variations or other factors. This ensures proper operation of the μC 64 by tripping the circuit breaker 30 in response to detection of an out-of-tolerance μC frequency reference.

The disclosed circuit breaker 30 allows tolerable variations in the frequency of the power source, but trips the circuit breaker 30 in response to any power source frequency variation, which risks damaging loads associated with the power source. This preserves critical timing of μC operations, which must occur synchronously with certain phase angles relative to the line-to-neutral source voltage, over an acceptable combination of ranges of power system frequency and μC reference frequency. This also detects an out-of-tolerance μC clock frequency or power source frequency (or any unacceptable combination thereof) and trips the circuit breaker 30 in response to these conditions.

Although separable contacts 40 are disclosed, suitable solid state separable contacts may be employed. For example, the disclosed circuit breaker 30 includes a suitable circuit interrupter mechanism, such as the separable contacts 40 that are opened and closed by the operating mechanism 44, although the invention is applicable to a wide range of circuit interruption mechanisms (e.g., without limitation, solid state or FET switches; contactor contacts) and/or solid state based control/protection devices (e.g., without limitation, drives; soft-starters).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method for a power circuit including a plurality of alternating current half-cycles having a plurality of zero crossings, said method comprising:
   detecting said zero crossings, a consecutive pair of said zero crossings defining a corresponding one of said half-cycles and a first variable frequency;
   employing a first timer to determine a first time of the corresponding one of said half-cycles, the first time being inversely related to the first variable frequency;
   employing a processor including a clock having a second variable frequency;
   employing a second timer to determine a second time of the clock, the second time being inversely related to the second variable frequency;
   determining a ratio of said first and second variable frequencies from the second time divided by the first time; and
   determining whether the ratio of said first and second variable frequencies exceeds a number of predetermined values for a plurality of said half-cycles and responsively interrupting said power circuit.

2. The method of claim 1 further comprising:
   repetitively sensing an electrical characteristic associated with said power circuit; and
   determining, for each of said half-cycles and responsive to said first timer, a number of samples of said electrical characteristic in a phase synchronized relationship to a corresponding one of said zero crossings.

* * * * *